Oct. 5, 1965    W. D. WASSELL    3,209,962
METERING DISPENSING CONTAINER
Filed Dec. 23, 1960    2 Sheets-Sheet 1

INVENTOR
WILLARD D. WASSELL
BY
Curtis, Morris & Safford
ATTORNEYS

Oct. 5, 1965    W. D. WASSELL    3,209,962
METERING DISPENSING CONTAINER
Filed Dec. 23, 1960    2 Sheets-Sheet 2
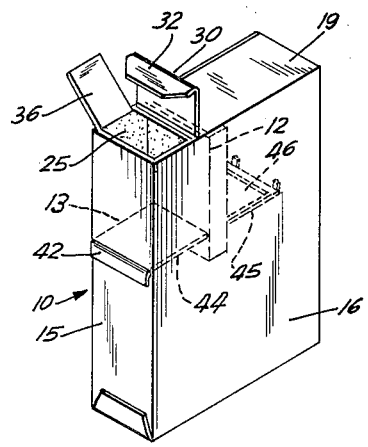
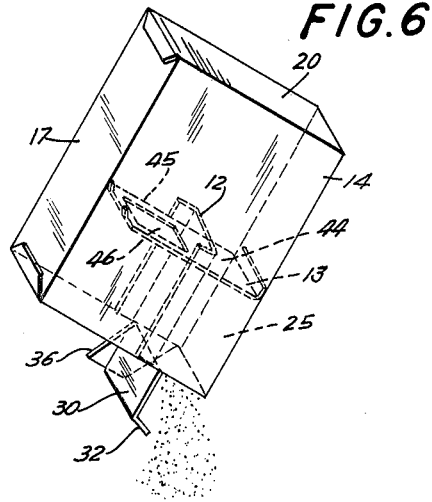
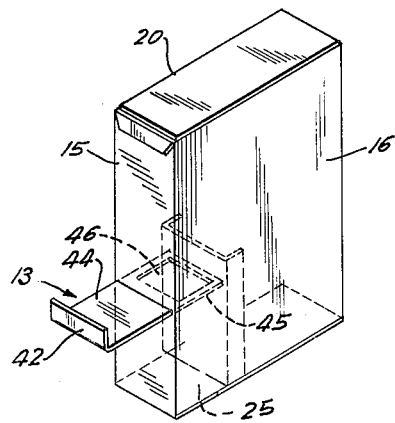
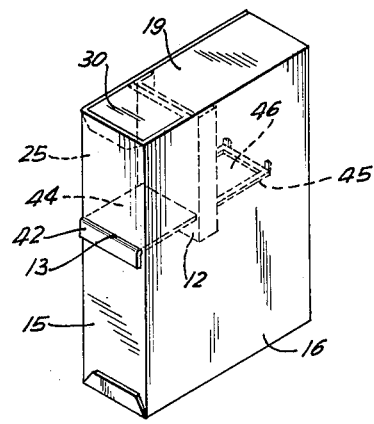
INVENTOR
WILLARD D. WASSELL
BY
Curtis, Morris & Safford
ATTORNEYS ര
United States Patent Office 3,209,962
Patented Oct. 5, 1965

3,209,962
METERING DISPENSING CONTAINER
Willard D. Wassell, 16 Revere Drive, Stamford, Conn.
Filed Dec. 23, 1960, Ser. No. 77,894
2 Claims. (Cl. 222—450)

The present invention relates to containers for dry particulate materials and more particularly to a container for dispensing measured quantities of the material therefrom.

There are many instances where it is desirable to dispense measured quantities of a material from the container in which it is shipped. For example, measured quantities of soap powder or flakes should be used in washing machines. It is the usual practice to pour the soap powder or flakes from the container into a measuring vessel and then from the vessel into the machine. Many times, however, the soap powder is allowed to overflow the measuring vessel, or a measuring vessel is not available and an estimated amount of soap powder is poured from the container. In either case, such dispensing of soap powder or flakes is necessarily wasteful. The same problem is presented with other dry fluid materials, such as flour, cereals and the like which are poured from containers in which they are shipped.

Dispensing containers have heretofore been proposed for delivering measured quantities of material, but all of these prior arrangements are either impractical or too expensive to manufacture. In one proposed construction, two separate slides are provided, each of which projects from the side of the box in which it is mounted and interferes with uniform stacking of the containers. In other proposed constructions, a number of special parts must be used which are not adapted for fabrication in conventional machines for forming and filling containers.

One of the objects of the present invention is to provide an improved construction in a container to facilitate the dispensing of measured quantities of a dry fluid material.

Another object is to provide a container of the type indicated which may be used to dispense measured quantities of material until the container is empty by merely tilting the container to different positions and operating a slide.

Still another object is to provide a dispensing container of the type indicated which is of simple and compact construction, economical to manufacture and one which is reliable in operation to dispense a measured quantity of material.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 5 is a perspective view of the container similar to FIGURE 2 and showing the hinged cover moved to a position to open the pocket;

FIGURE 6 is a view similar to FIGURE 5 showing the container tipped to dispense the measured quantity of the material from the pocket;

FIGURE 7 is a view similar to FIGURE 6 showing the hinged cover closed and the slide withdrawn to refill the pocket with a measured quantity of the material; and FIGURE 8 is a view similar to FIGURE 7 and showing the slide moved to close the bottom of the pocket to segregate another measured quantity of the material and the container tipped back to its original upright position.

Figure 1:
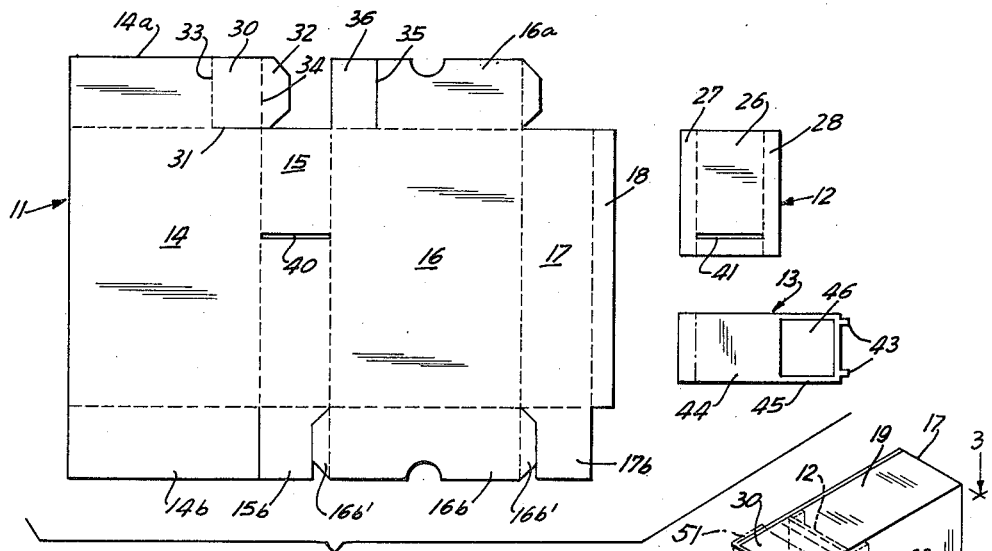
FIGURE 1 is a composite view of the parts used to fabricate a dispensing container incorporating the novel features of the present invention.
Figure 2:
FIGURE 2 is a perspective view of a container made from the parts illustrated in FIGURE 1 and showing the pocket formed in one corner thereof.
Figure 3:
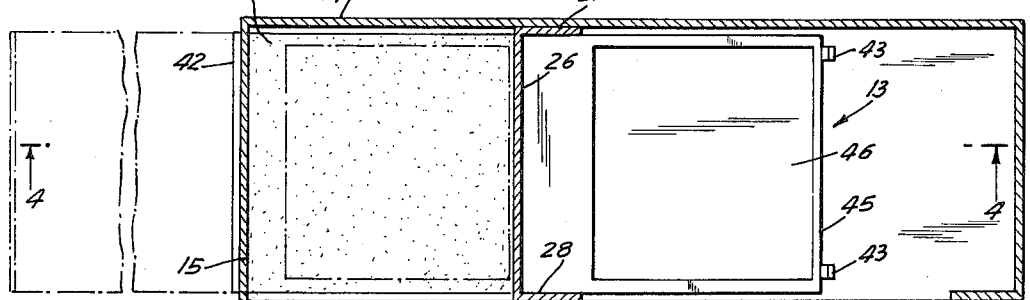
FIGURE 3 is a sectional plan view taken on line 3—3 of FIGURE 2 to show the two positions of the slide for closing and opening the bottom of the pocket.
Figure 4:
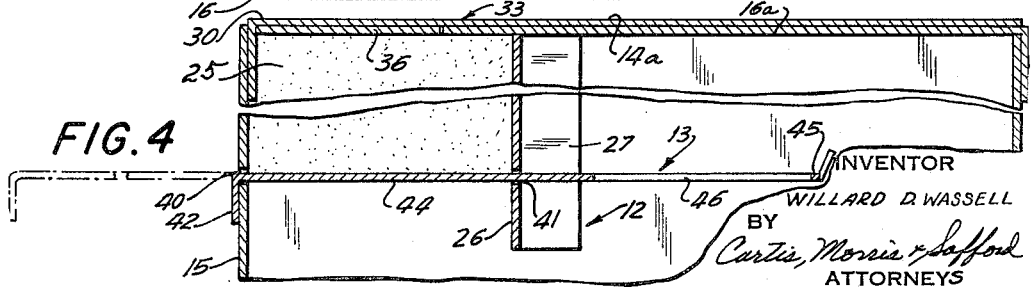
FIGURE 4 is a sectional view taken on line 4—4 of FIGURE 3 to show the slide in side elevation.

Referring now to the drawings, a container 10 as illustrated in FIGURE 2 is made from a blank 11 illustrated in FIGURE 1 and incorporates the novel features of the present invention. The container 10 is of generally conventional form to adapt it to be manufactured and filled by the conventional box making and filling machines. However, the container 10 includes improved constructional features to adapt it to dispense measured quantities of material. The dispensing container 10 is fabricated from the three parts illustrated in FIGURE 1 comprising a paper board box blank 11, an insert 12 and a slide 13.

Box blank 11 is cut from a continuous web of paper board stock and scored to form adjacent panels 14, 15, 16 and 17 which, when the blank is folded, form opposed side walls 14, 16 and 15, 17, respectively. Panel 17 has a lap strip 18 at its outer edge which is pasted to the panel 14 adjacent its edge to form the tubular body of the container. Extension flaps 14a, 14b and 16a, 16b project from the opposite ends of each of the panels 14, 16. Extension flaps 14a, 14b and 16a 16b are folded into overlapping relationship at each end of the panel and pasted to each other to form opposed end walls 19 and 20, see FIGURE 2. Flaps 15b and 17b also project from one end of panels 15 and 17 and are folded under the flaps 14b and 16b and pasted thereto to form a part of the composite end closure 20. Flap 16b also has extensions 16b' which are folded upwardly over the panels 15 and 17 to complete the closure and provide a seal. As thus far described, the container 10 is of conventional construction.

In accordance with the present invention, a measuring pocket 25 is provided in one corner of the container 10 as illustrated in FIGURES 2 to 8. Pocket 25 is formed between the wall 15 of the container 10 and insert 12 and between a hinged cover 30 in end wall 19 and slide 13. Pocket 25 is adapted to hold a measured quantity of material to be dispensed and the pocket may be opened and closed at one end by the hinged cover 30 and at the other end by the slide 13. The pocket 25 may be made of a size to hold any desired quantity of the particular material to be dispensed from the container 10.

The insert 12 may be composed of paper board or other suitable material to provide a central panel 26 of a width corresponding to the width of the panel 15, see FIGURE 1, and is attached to the side walls 14 and 16 in any suitable way. For example, the insert 12 may be constructed of sheet metal with tabs projecting through slots in the side walls and crimped. In the illustrated embodiment, however, the insert 12 is composed of paper board to provide a panel 26 and flaps 27 and 28 at opposite sides. The insert 12 is mounted in the container 10 with the panel 26 generally parallel to the wall 15 and its end abutting the end wall 19. Insert 12 is retained in position in the container 10 by the flaps 27 and 28 at each side of the panel 26 which are folded at right angles to the panel 26 to overlie the walls 14 and 16 of the container 10 and pasted thereto.

The hinged closure flap 30 at the upper end of the pocket 25, as illustrated in FIGURE 2, comprises a portion of the flap 14a severed from the panel 14 along the fold line 31, and extending a distance less than the width of the pocket 25. Closure 30 has a tongue extension 32 projecting from the flap 14a beyond the panel 14 of the blank 11 as illustrated in FIGURE 1. Closure 30 is adapted to hinge on the scored line 33 and tongue 32 is adapted to fold relative to the closure along the scored line 34. Flap 16a also is cut on line 35 as illustrated in FIGURE 1 to form a separate tab flap 36 which is adapted to underlie the hinged closure flap 30. When the blank 11 is folded to form the container 10, the portion of the flap 14a beyond the hinged closure flap 30 overlies and is pasted to the portion of the flap 16b extending beyond the tab flap portion 36 to form the top closure 19. Thus, the movable closure flap 30 and movable tab flap 36 adapt the upper end of the pocket to be opened and closed as illustrated in FIGURES 5 and 8. When the hinged closure flap 30 is closed the folded tongue 32 is positioned between the side edge of tab flap 36 and the wall 15 of container 10 to frictionally hold the closure flap in closed position.

The panel 15 and insert 12 have aligned slots 40 and 41 for mounting the slide 13 therein. Slide 13 has a length at least twice the width of pocket 25 so that the slide is at all times supported at spaced points by the wall 15 and insert 12 below the slots 40 and 41. Slide 13 may be composed of any suitable material, such as paper board, plastic or the like, but preferably it is made of thin sheet metal stock. As shown in the drawings, the slide 13 has a right angular flange 42 at its forward end which overlies the end wall 15 of the container 10 to limit its inward movement, and stop lugs 43 at its rearward end for engaging the panel 26 of the insert 12 to limit the outward movement of the slide. Flange 42 may project upwardly or downwardly, preferably downwardly, and stop lugs 43 may project in either direction, but preferably upward. The portion 44 of the slide 13 adjacent the flange 42 is imperforate and the section 45 extending beyond the insert 12 has an opening 46 therein. Thus, when the slide 13 is moved inwardly to the position illustrated in FIGURES 2 and 5, the imperforate portion 44 closes the bottom of the pocket 25 and the opening 46 in the portion 45 extending beyond the insert 12 provides an opening through which material may flow from the top to the bottom of the container 10. On the other hand, when the slide 13 is moved outwardly to the positions illustrated in FIGURES 6 and 7 material may flow from the interior of the container 10 into the pocket 25. One form of the invention having now been described in detail the mode of operation is next explained.

The blank 11, illustrated in FIGURE 1, is first folded to form a rectangular container body and the lap strip 18 attached to the edge portion of the panel 14 to join and seal the adjacent edges. The upstanding flap 16a is then folded downwardly and the flap 14a folded to overlie the flap 16a and pasted thereto between the score line 33 and the end of the flaps to form the closure 19. The tab flap 36 of the flap 16a and the overlying hinged closure flap 30 are then free for movement relative to the closure 19. The tongue 32 of hinged closure flap 30 is folded downwardly and inserted over the flap to complete the closure of the open end of the pocket 25. Slide 13 is then inserted through the aligned slots 40 and 41 in the wall 15 and insert 12, respectively, and the lugs 43 upset to provide stops.

The slide 13 is withdrawn to position the opening 46 over the bottom of the pocket 25 and the container 10 is filled with the particulate material through the open bottom and the material flows through the opening to fill the pocket as well as the remainder of the container. The extension flaps 15b, 17b and 14b, 16b are then folded into over-lapping relationship and pasted to each other to complete the end closure 20. After the container 10 has been filled, the slide 13 is moved inwardly to the position illustrated in FIGURES 2 and 5 to close the bottom of the pocket 25 and trap a measured qantity of a particulate material therein. Preferably, removable strips 50 and 51 are placed over the upstanding flange 42 of the slide 13 and the closure 30 at the top of the pocket 25 to prevent siftinging of particulate material during shipment. It will be noted that with the improved construction of the present invention are no projections from the sides or ends of the container 10 which will interfere with packing them in side by side or overlying relationship. In other words, the hinged closure 30 is flush with the end closure 19 and the upstanding flange 42 of the slide 13 is substantially flush with the side 15 of the container.

When the container 10 is to be used, the sealing strips 50 and 51 are removed from the hinged closure 30 and end of slide 13, and the hinged closure and tab flap 36 are withdrawn as illustrated in FIGURE 5. The container 10 is then tilted from the position illustrated in FIGURE 5 to that illustrated in FIGURE 6 to dispense the measured quantity of material container in the pocket 25. The imperforate portion 44 of the slide 13 prevents any additional material from flowing into the pocket 25 during a dispensing operation.

To prepare the container 10 to dispense another measured quantity of the particulate material, the closure flaps 36 and 30 are moved to the closed position while the container is held in its inverted position illustrated in FIGURE 7 after which the slide 13 is withdrawn. Opening 46 in portion 45 of slide 13 then overlies the bottom of the pocket 25 so that material in the container will flow through the opening into the pocket. After the pocket 25 has been filled, the slide 13 is moved back to its initial position and the box tilted to upright position as illurated in FIGURE 8 which segregates another measuredt quantity of the material in the pocket. The container 10 is then ready to be used to dispense the measured quantity of material from pocket 25 as previously explained. The operations of filling pocket 25 with a measured quantity of the material and dispensing the material are continued successively until the container 10 is empty.

It will now be observed that the present invention provides an improved construction in a container for dispensing measured quantities of dry fluid materials. It also will be observed that the present invention provides a container which will dispense successive measured quantities of material until the container is empty by merely tilting the container and operating a slide. It will still further be observed that the present invention provides a dispensing container of the type indicated which is of simple and compact construction, economical to manufacture and one which is reliable in operation to dispense measured quantities of the material.

While a single embodiment of the invention is herein illustrated and described, it will be understood that changes may be in the construction and arrangement of elements without departing from the spirit or scope of the invention. Therefore, without limitation in this respect, the invention is defined by the following claims.

I claim:

1. A container for dispensing measured quantities of a particulate material comprising opposed pairs of side walls and end walls, an intermediate wall extending between one pair of opposed side walls at right angles thereto with one end abutting an imperforate portion of one end wall at right angles thereto and extending generally parallel to the other pair of side walls to form a pocket in one corner of the container, said intermediate wall and one of said other side wall having aligned slots therein, a slide mounted to slide in said aligned slots and entirely supported at spaced locations by the portions of said walls below the slots so that one end only of the slide projects from the container, said slide having an opening therein adjacent one end and extending for a distance less than one half its length to overlie the pocket when the slide is in one position and provide an imperforate portion extending from the opening to the other end of the slide for a distance greater than one half its length and greater than the distance between the intermediate and side walls having the slots for underlying and closing the pocket when the slide is moved to another position, and said slide being movable to one position to locate the opening under the pocket to open the bottom of said pocket to receive particulate material in the container and movable to another position to locate the imperforate potrion of the slide over the entire area of the pocket to close the bottom thereof and segregate a measured quantity of the material therein, means projecting from said slide at longitudinally spaced locations for engaging at least one of the walls to limit the movement of said slide in both directions, and hinged closure means to open the top of the pocket to dispense the measured quantity of particulate material therefrom.

2. A container for dispensing measured quantities of a particulate material comprising opposed pairs of side walls and end walls, an intermediate wall extending between one pair of opposed side walls at right angles thereto with one end abutting an imperforate portion of one end wall at right angles thereto and extending generally parallel to the other pair of side walls to form a pocket in one corner of the container, said intermediate wall and one of said other side walls having aligned slots therein, a slide mounted to slide in said aligned slots and supported at spaced locations by the portions of said walls below the slots so that one end only of the slide projects from the container, said slide having an opening therein adjacent one end and extending for a distance less than one half its length to overlie the pocket when the slide is in one position and provide an imperforate portion extending from the opening to the other end of the slide for a distance greater than one half of its length and greater than the distance between the intermediate and side walls having the slots for underlying and closing the pocket when the slide is moved to another position, and said slide being movable to one position to locate the opening under the pocket to open the bottom of said pocket to receive particulate material in the container and movable to another position to locate the imperforate portion of the slide over the entire area of the pocket to close the bottom thereof and segregate a measured quantity of the material therein, means projecting from said slide at longitudinally spaced locations for engaging at least one of the walls to limit the movement of said slide in both directions, and hinged closure means in one wall of the pocket to open the pocket to dispense the measured quantity of particulate material therefrom.

References Cited by the Examiner
UNITED STATES PATENTS

| | | | |
|---|---|---|---|
| 1,495,723 | 5/24 | Birnbaum | 222—425 |
| 1,944,551 | 1/34 | Forknall | 222—559 |
| 2,372,278 | 3/45 | Jess | 222—450 X |
| 2,880,915 | 4/59 | Kantor | 222—456 |

M. HENSON WOOD, JR., *Primary Examiner.*

LOUIS J. DEMBO, LAVERNE D. GEIGER, RAPHAEL M. LUPO, *Examiners.*